US012676804B2

(12) United States Patent
Kang et al.

(10) Patent No.: US 12,676,804 B2
(45) Date of Patent: Jul. 7, 2026

(54) APPARATUS AND METHOD FOR DYNAMIC CONTROL OF NETWORK

(71) Applicant: SAMSUNG SDS CO., LTD., Seoul (KR)

(72) Inventors: Yewon Kang, Seoul (KR); Jungeun Lee, Seoul (KR); Junghwan Cha, Seoul (KR); Hansaem Seo, Seoul (KR); Shinhyeok Kang, Seoul (KR); Jongsung Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 4 days.

(21) Appl. No.: 18/737,797

(22) Filed: Jun. 7, 2024

(65) Prior Publication Data

US 2025/0080437 A1 Mar. 6, 2025

(30) Foreign Application Priority Data

Sep. 5, 2023 (KR) ........................ 10-2023-0117529

(51) Int. Cl.
*G06F 15/173* (2006.01)
*H04L 43/08* (2022.01)

(52) U.S. Cl.
CPC .................................... *H04L 43/08* (2013.01)

(58) Field of Classification Search
None
See application file for complete search history.

(56) References Cited

U.S. PATENT DOCUMENTS

| | | | | |
|---|---|---|---|---|
| 11,310,155 | B1 * | 4/2022 | Qian ..................... | H04L 45/123 |
| 11,743,108 | B1 * | 8/2023 | Viswambharan ... | H04L 41/0661 |
| | | | | 709/224 |
| 2019/0324882 | A1 | 10/2019 | Borello et al. | |
| 2020/0092201 | A1 * | 3/2020 | Tillotson ............... | H04L 45/306 |
| 2021/0243091 | A1 * | 8/2021 | Raney ................... | H04L 9/0819 |
| 2022/0004624 | A1 | 1/2022 | Revivo et al. | |
| 2022/0278900 | A1 | 9/2022 | Pieczul et al. | |
| 2022/0385631 | A1 * | 12/2022 | McDowall .......... | H04L 63/0236 |
| 2023/0075355 | A1 * | 3/2023 | Twigg .................. | H04L 67/306 |
| 2024/0349089 | A1 * | 10/2024 | Ficara ................. | H04L 41/0686 |

FOREIGN PATENT DOCUMENTS

| | | |
|---|---|---|
| CN | 111917586 A | 11/2020 |
| CN | 113794605 A | 12/2021 |
| CN | 114338524 A | 4/2022 |
| CN | 115328742 A | 11/2022 |
| CN | 115543531 A | 12/2022 |
| CN | 115576649 A | 1/2023 |
| CN | 116244071 A | 6/2023 |
| KR | 10-1987664 B1 | 6/2019 |

* cited by examiner

*Primary Examiner* — Phuoc H Nguyen
(74) *Attorney, Agent, or Firm* — NSIP Law

(57) ABSTRACT

An apparatus for dynamic control of a network, the apparatus includes a processor, and a storage medium recording one or more programs configured to be executable by the processor. The one or more programs include instructions for executing collecting network monitoring information, determining, based on the network monitoring information, whether a network abnormality condition is satisfied, and loading, based on a result of the determination, an extended Berkeley packet filter (eBPF) program controlling a network environment.

12 Claims, 5 Drawing Sheets

S120

START

DETECT ONE OR MORE EVENTS INCLUDED IN NETWORK MONITORING INFORMATION — S121

DETERMINE WHETHER ONE OR MORE EVENTS SATISFY NETWORK ABNORMALITY CONDITION — S122

END

APPARATUS AND METHOD FOR DYNAMIC CONTROL OF NETWORK

CROSS-REFERENCE TO RELATED APPLICATION(S)

This application claims benefit of priority to Korean Patent Application No. 10-2023-0117529 filed on Sep. 5, 2023 in the Korean Intellectual Property Office, the disclosure of which is incorporated herein by reference in its entirety.

BACKGROUND

1. Field

The present disclosure relates to an apparatus and method for dynamic control of a network.

2. Description of Related Art

As various systems are converted to a cloud environment, the scalability of services has been increased, and it has become possible to use resources flexibly. However, the complexity of services has been increased due to changes resulting from conversion to a cloud environment.

Kubernetes may be a container orchestration platform automating and managing a process of containerizing applications, and deploying, managing, and scaling the containerized applications. Kubernetes may perform operations of dividing applications into multiple containers, distributing the multiple containers to multiple nodes, and executing containers. Components of the multiple distributed services may dynamically interact with each other, such that a connection relationship between components and a flow of data may be complicated.

In addition, a configuration in a Kubernetes-based cloud environment may be diversified, such that each service may generate different types of metrics, and data may be abstracted, making it difficult to track performance of a service.

In addition, a network monitoring method according to the related art may need to modify a kernel or service to measure new metrics, making it impossible to dynamically control a network and being unsuitable for a cloud environment.

In addition, a monitoring method for capturing and analyzing packets according to the related art may require a high resource occupancy, such that an additional load necessary for observation may occur in a network, adversely affecting application performance itself.

Accordingly, there is a demand for a method for observing a network in real time and taking appropriate measures in response to various network problematic situations in a Kubernetes-based cloud environment in which it is difficult to perform observation and control.

RELATED ART

Patent Document

Patent Document 1: Chinese Patent Application Publication No. 113794605 (Dec. 14, 2021)

SUMMARY

An aspect of the present disclosure provides an apparatus and method for dynamic control of a network, the apparatus and method capable of observing a network condition in real time while minimizing the use of an additional resource, using extended Berkeley Packet Filter (eBPF) technology.

Another aspect of the present disclosure provides an apparatus and method for dynamic control of a network, the apparatus and method capable of simplifying a cluster management task and minimizing occurrence of overhead by monitoring a network state and controlling a network within a worker node in a Kubernetes environment.

Another aspect of the present disclosure provides an apparatus and method for dynamic control of a network, the apparatus and method capable of efficiently and stably operating a system by rapidly detecting occurrence of a problematic situation in a network and taking a countermeasure.

According to an aspect of the present disclosure, there is provided an apparatus for dynamic control of a network, the apparatus including a processor, and a storage medium recording one or more programs configured to be executable by the processor. The one or more programs may include instructions for executing collecting network monitoring information, determining, based on the network monitoring information, whether a network abnormality condition is satisfied, and loading, based on a result of the determination, an eBPF program controlling a network environment.

According to another aspect of the present disclosure, there is provided a method for dynamic control of a network, the method performed by a computing device including a processor and a storage medium recording one or more programs configured to be executable by the processor, the method including collecting network monitoring information, determining, based on the network monitoring information, whether a network abnormality condition is satisfied, and loading, based on a result of the determination, an eBPF program controlling a network environment.

According to another aspect of the present disclosure, there is provided a computer-readable storage medium recording a program for executing the method on a computer.

According to example embodiments of the present disclosure, an apparatus and method for dynamic control of a network, the apparatus and method may observe a network condition in real time while minimizing the use of an additional resource, using eBPF technology.

According to example embodiments of the present disclosure, an apparatus and method for dynamic control of a network, the apparatus and method may simplify a cluster management task and minimize occurrence of overhead by monitoring a network state and controlling a network within a worker node in a Kubernetes environment.

According to example embodiments of the present disclosure, an apparatus and method for dynamic control of a network, the apparatus and method may efficiently and stably operate a system by rapidly detecting occurrence of a problematic situation in a network and taking a countermeasure.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, specific example embodiments of the present disclosure will be described with reference to the accompanying drawings. The following detailed description is provided to aid in a comprehensive understanding of a method, a device and/or a system described in the present specification. However, the detailed description is for illustrative purposes only, and the present disclosure is not limited thereto.

In describing the example embodiments of the present disclosure, when it is determined that a detailed description of a known technology related to the present disclosure may unnecessarily obscure the gist of the present disclosure, the detailed description thereof will be omitted. In addition, terms to be described later are terms defined in consideration of functions in the present disclosure, which may vary depending on intention or custom of a user or operator. Therefore, the definition of these terms should be made based on the contents throughout the present specification. The terminology used herein is for the purpose of describing particular example embodiments only and is not to be construed as being limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Figure 1:
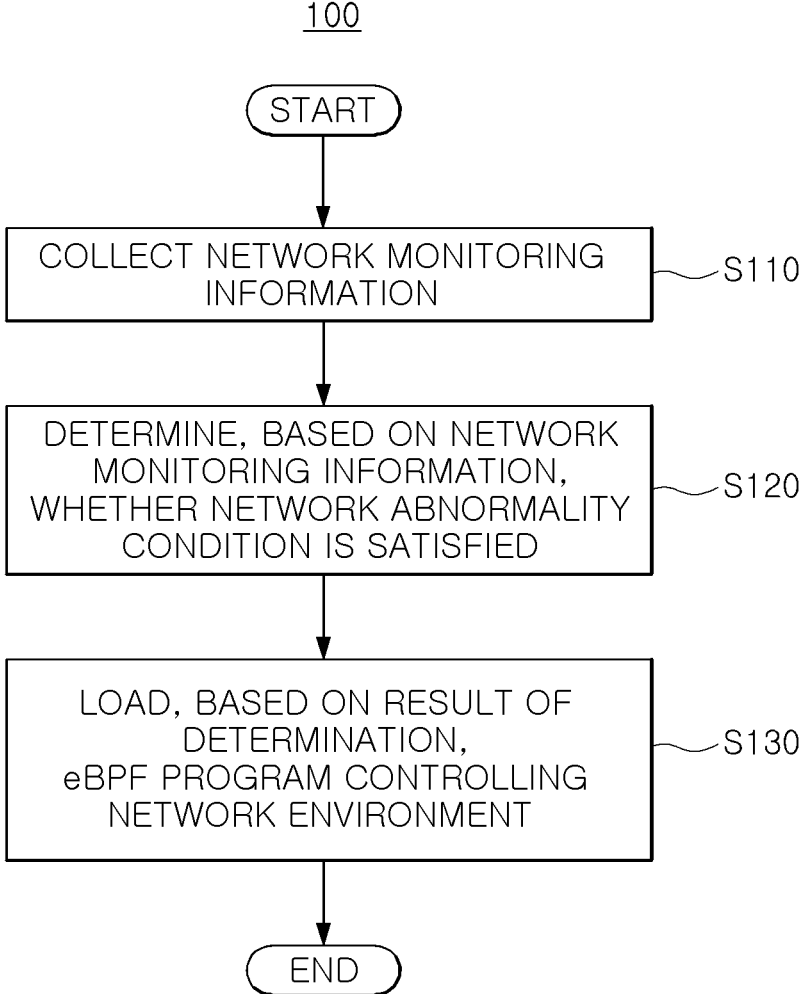
FIG. 1 is a flowchart of a method for dynamic control of a network according to an example embodiment of the present disclosure.

FIG. 1 is a flowchart of a method for dynamic control of a network according to an example embodiment of the present disclosure.

Referring to FIG. 1, a method 100 for dynamic control of a network, the method 100 may include an operation (S110) of collecting network monitoring information, an operation (S120) of determining, based on the network monitoring information, whether a network abnormality condition is satisfied, and an operation (S130) of loading, based on a result of the determination, an extended Berkeley packet filter (eBPF) program controlling a network environment.

In the operation (S110), the network monitoring information may include network metric information. The network monitoring information, information obtained by performing measurement on a container basis, may include, for example, round trip time (RTT) information or information about packet transmission.

In the operation (S120), the network abnormality condition may be set based on at least one of, for example, an RTT increase rate, a packet retransmission rate, and an inter-packet delay change rate.

The network abnormality condition may include one or more abnormal conditions. As for the network abnormality condition, one or more conditions may be added, partially or entirely modified, or partially or entirely deleted before or while the method 100 is performed.

In the operation (S130), the eBPF program controlling the network environment may include a network bandwidth change eBPF program, a routing path change eBPF program, a host notification generation eBPF program, a QOS execution eBPF program, and a host change eBPF program.

In the method 100 according to the present disclosure, the eBPF program controlling the network environment may be loaded when the network abnormality condition is satisfied, thereby automating a network control plane. A network resource may be efficiently used and a network problematic situation may be rapidly responded, thereby improving efficiency and stability of a system operation.

Figure 2A:
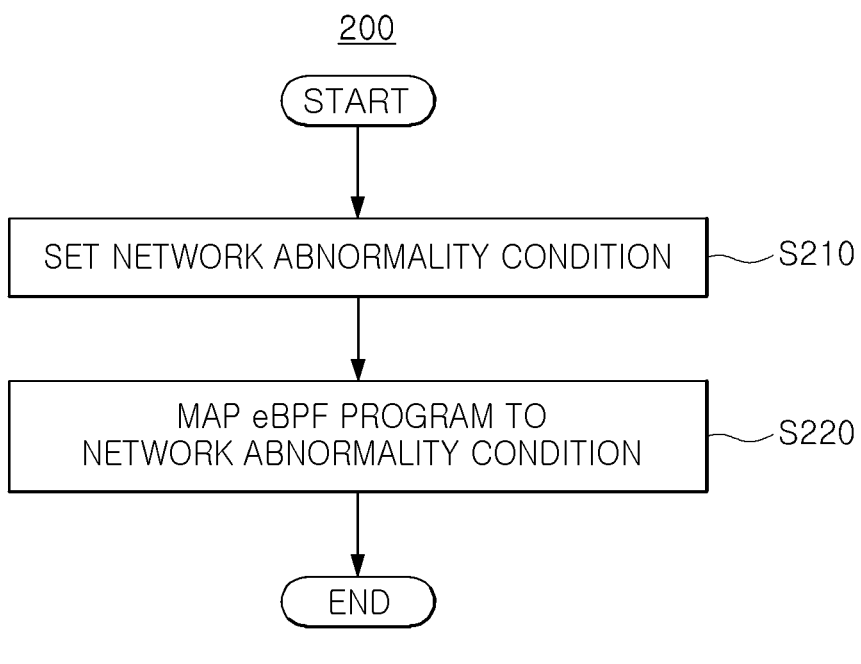
FIG. 2A is a flowchart of a method for dynamic control of a network according to an example embodiment of the present disclosure.

FIG. 2A is a flowchart of a method for dynamic control of a network according to an example embodiment of the present disclosure. For example, a method 200 for dynamic control of a network, illustrated in FIG. 2A, the method 200 may be performed before the operation (S110) of collecting the network monitoring information, included in the method 100 illustrated in FIG. 1.

Referring to FIG. 2A, the method 200 may include an operation (S210) of setting a network abnormality condition, and an operation (S220) of mapping an eBPF program to the network abnormality condition.

Figure 2B:
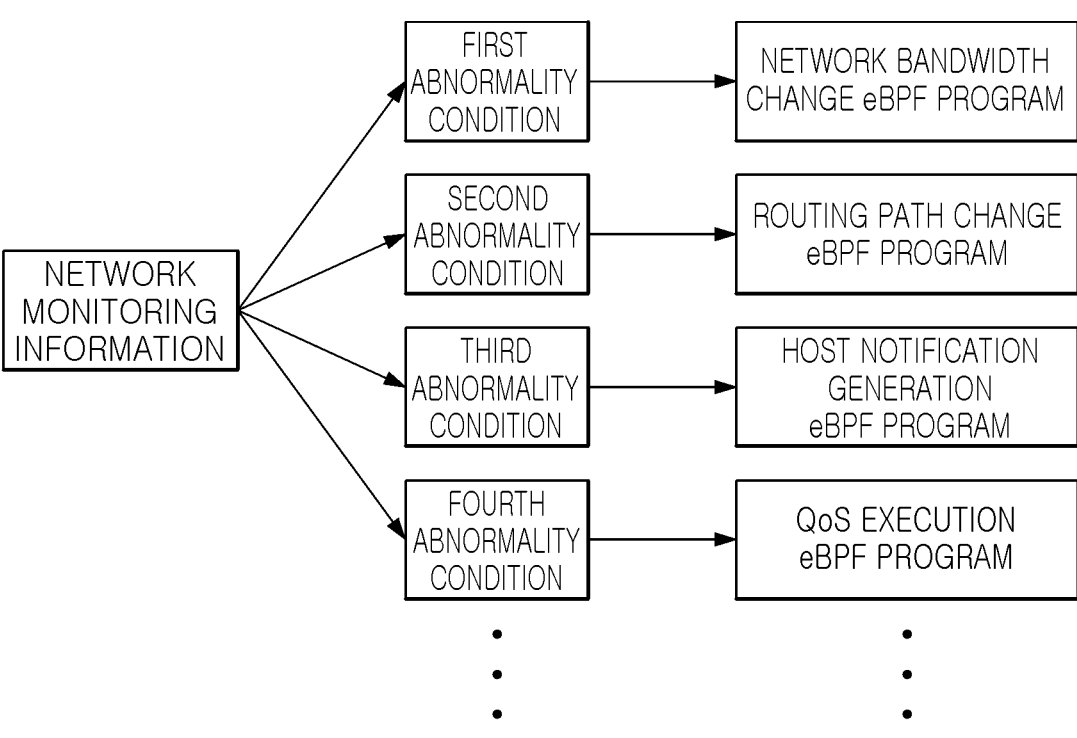
FIG. 2B illustrates an example of an extended Berkeley Packet Filter (eBPF) program mapped to an abnormal condition in a method for dynamic control of a network according to an example embodiment of the present disclosure.

FIG. 2B illustrates an example of a method for mapping an eBPF program to a network abnormality condition.

The network abnormality condition may include one or more abnormal conditions. For example, the network abnormal condition may include first to fourth abnormal conditions, as illustrated in FIG. 2B.

For example, the first abnormality condition may be set to be satisfied when an event is detected in which an RTT increase rate, derived from network monitoring information, is 4 times or more.

In addition, the second abnormality condition may be set to be satisfied when an event is detected in which a packet retransmission rate, derived from the network monitoring information, is 2% or more.

In addition, the third abnormality condition may be set to be satisfied when an event is detected in which an inter-packet delay change rate, derived from the network monitoring information, is 4 times or more and the RTT increase rate, derived from the network monitoring information, is 3 times or more.

In addition, the fourth abnormality condition may be set to be satisfied when an event is detected in which the inter-packet delay change rate, derived from the network monitoring information, is 4 times or more and the RTT increase rate, derived from the network monitoring information, is less than 3 times.

The first to fourth abnormal conditions, included in the above-described network abnormal condition, are merely illustrative descriptions of the network abnormal condition, and the network abnormal condition may be flexibly set according to a network situation and a management policy.

As illustrated in FIG. 2B, the network abnormality condition may be mapped to one or more eBPF programs.

For example, the first abnormality condition being satisfied when an event is detected in which the RTT increase rate, derived from the network monitoring information, is 4 times or more may be mapped to the network bandwidth change eBPF program.

The network bandwidth change eBPF program may perform an operation of dynamically adjusting a network bandwidth, as the first abnormality condition is satisfied.

In addition, the second abnormality condition being satisfied when an event is detected in which the packet retransmission rate, derived from the network monitoring information, is 2% or more may be mapped to the routing path change eBPF program.

The routing path change eBPF program may perform an operation of changing a network routing path, as the second abnormality condition is satisfied.

In addition, the third abnormality condition, being satisfied when an event in which the inter-packet delay change rate, derived from the network monitoring information, is 4 times or more and an event in which the RTT increase rate, derived from the network monitoring information, is 3 times or more are detected, may be mapped to the host notification generation eBPF program.

The host notification generation eBPF program may perform an operation of generating a notification notifying a host side that an additional measure is necessary to reduce processing time, as the third abnormality condition is satisfied.

In addition, the fourth abnormality condition being satisfied when an event is detected in which the inter-packet delay change rate, derived from the network monitoring information, is 4 times or more and the RTT increase rate, derived from the network monitoring information, is less than 3 times may be mapped to the QoS execution eBPF program.

The QOS execution eBPF program may perform an operation for network congestion control, as the fourth abnormality condition is satisfied.

The eBPF program mapped to the network abnormality condition, illustrated in FIG. 2B, is merely an example. Depending on a network situation and a management policy, the eBPF program, illustrated in FIG. 2B, may be mapped to one or more other abnormal conditions, or one or more eBPF programs performing other operations, not illustrated in FIG. 2B, may also be mapped to one or more abnormal conditions.

Figure 3:
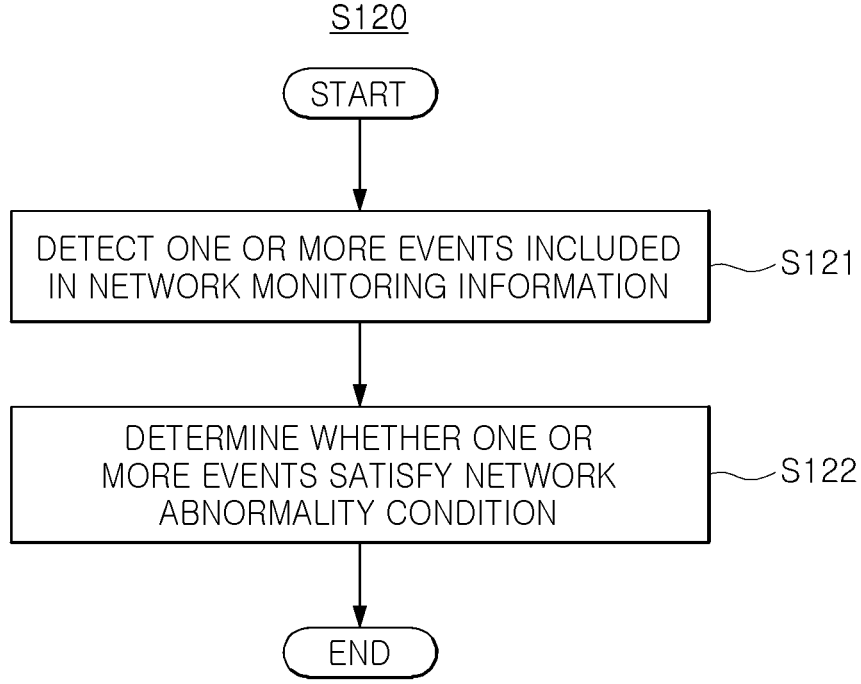
FIG. 3 is a flowchart of a method for dynamic control of a network according to an example embodiment of the present disclosure.

FIG. 3 is an exemplary flowchart of detailed operations included in the operation (S120) of determining whether the network abnormality condition is satisfied, in the method 100 illustrated in FIG. 1.

Referring to FIG. 3, the operation (S120) of determining whether the network abnormality condition is satisfied may include an operation (S121) of detecting one or more events included in the network monitoring information, and an operation (S122) of determining whether the one or more events satisfy the network abnormality condition.

For example, in the operation (S121) of detecting the one or more events included in the network monitoring information, when the RTT increase rate, derived from the network monitoring information, is within a preset range or outside the preset range, one event may be detected.

In the operation (S122) of determining whether the one or more events satisfy the network abnormality condition, it may be determined that the first abnormality condition is satisfied when an event is detected in which the RTT increase rate is 4 times or more in the operation (S121). An apparatus for dynamic control of a network, the apparatus may execute an eBPF program mapped to the first abnormality condition.

For another example, in the operation (S121) of detecting the one or more events included in the network monitoring information, when the packet retransmission rate, derived from the network monitoring information, is within a preset range or is outside the preset range, one event may be detected.

In the operation (S122) of determining whether the one or more events satisfy the network abnormality condition, it may be determined that the second abnormality condition is satisfied when an event is detected in which the packet retransmission rate is 2% or more in the operation (S121). The apparatus may execute an eBPF program mapped to the second abnormality condition.

For another example, in the operation (S121) of detecting the one or more events included in the network monitoring information, when the inter-packet delay change rate, derived from the network monitoring information, is within a preset range or outside the preset range, one event may be detected.

In the operation (S122) of determining whether the one or more events satisfy the network abnormality condition, when an event in which the inter-packet delay change rate is 4 times or more and an event in which the RTT increase rate is 3 times or more are detected in the operation (S121), it may be determined that the third abnormality condition is satisfied. The apparatus may execute an eBPF program mapped to the third abnormality condition.

In addition, in the operation (S122) of determining whether the one or more events satisfy the network abnormality condition, when an event in which the inter-packet delay change rate is 4 times or more and an event in which the RTT increase rate is less than 3 times are detected in the operation (S121), it may be determined that the fourth abnormality condition is satisfied. The apparatus may execute an eBPF program mapped to the fourth abnormality condition.

The method 100, illustrated in FIG. 1, may further include an operation of receiving a packet including identification information, and an operation of determining whether a flow of the packet has been generated, before the operation (S110) of collecting the network monitoring information.

The identification information, included in the packet, may be, for example, a 5-tuple including source IP information, source port information, destination IP information, destination port information, and protocol information.

For example, in the method 100, the operation (S110) of collecting the network monitoring information may be performed when it is determined that a flow of the packet has been generated.

In addition, the method 100 may further include an operation of determining whether the flow of the packet has been terminated, after the operation (S130) of loading the eBPF program.

For example, in the method 100, when it is determined that the flow of the packet has not been terminated, the operation (S110) of collecting the network monitoring information, the operation (S120) of determining, based on the network monitoring information, whether the network abnormality condition is satisfied, and the operation (S130) of loading, based on the result of the determination, the eBPF program controlling the network environment may be performed again.

That is, the method 100 according to the present disclosure may monitor a network state until the flow of the packet is terminated and take an appropriate countermeasure when an abnormality occurs, thereby stably maintaining a system.

Figure 4:
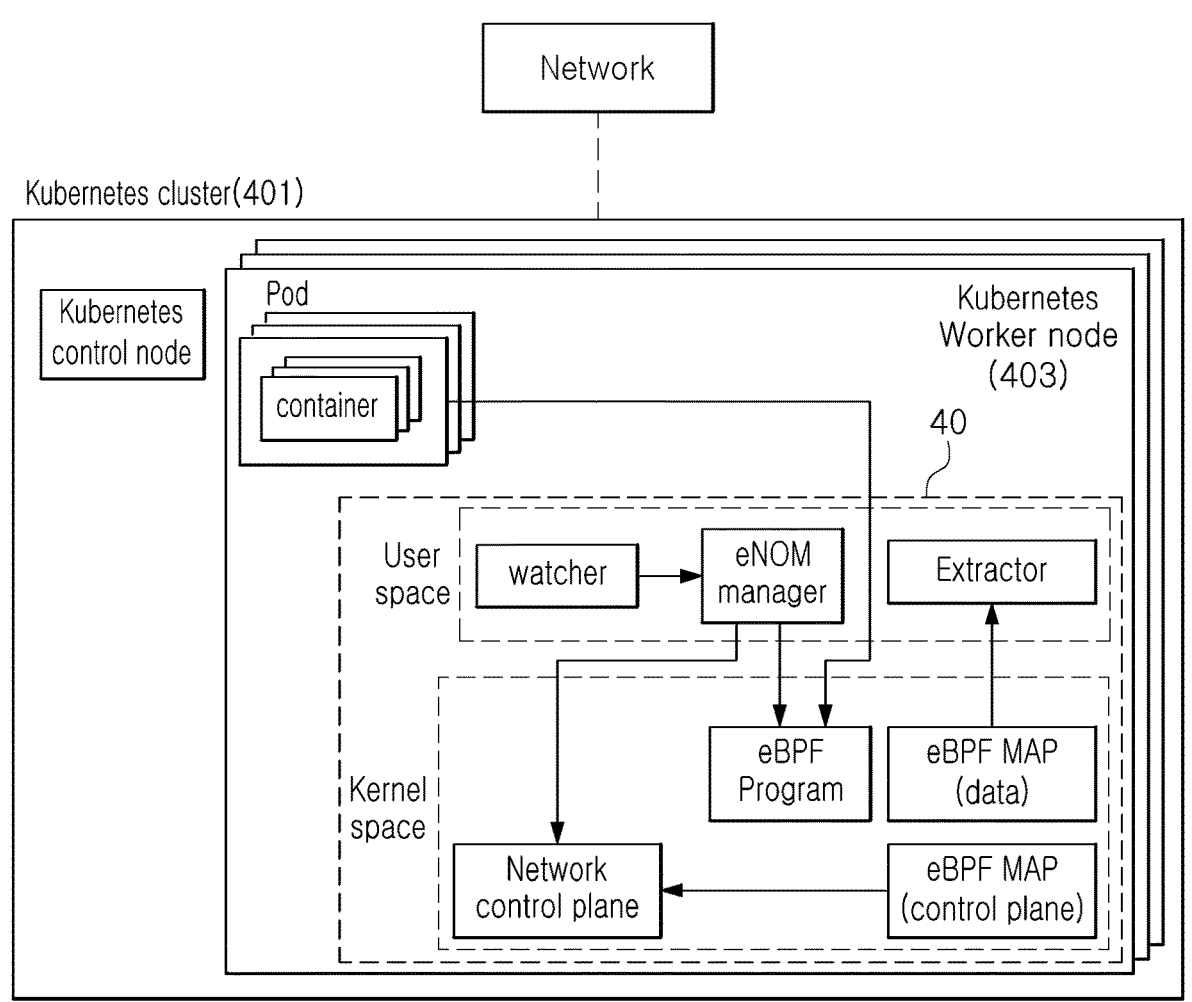
FIG. 4 schematically illustrates a configuration of an apparatus for dynamic control of a network according to an example embodiment of the present disclosure.

FIG. 4 schematically illustrates a configuration of an apparatus for dynamic control of a network according to an example embodiment of the present disclosure.

An apparatus 40 for dynamic control of a network, illustrated in FIG. 4, the apparatus 40 may collect and transmit information about a change in a Kubernetes component or information about a change in process ID (PID) using a watcher in a user space level.

The apparatus 40 may perform an operation of loading, unloading, or updating an eBPF program using an eNOM Manager in the user space.

In addition, the apparatus 40 may periodically provide metric data using an extractor in the user space. The extractor may be an endpoint for providing map information of each node in a Kubernetes worker node 403.

The apparatus 40 may store metric data or a program for a network control plane using an eBPF MAP in a kernel space.

In addition, the apparatus 40 may perform a specific operation by loading a program, stored in the eBPF map, using the network control plane in the kernel space.

Referring to FIG. 4, the apparatus according to the present disclosure may perform an operation within the Kubernetes worker node 403, thereby simplifying a task of managing a Kubernetes cluster 401 and minimizing occurrence of overhead.

Figure 5:
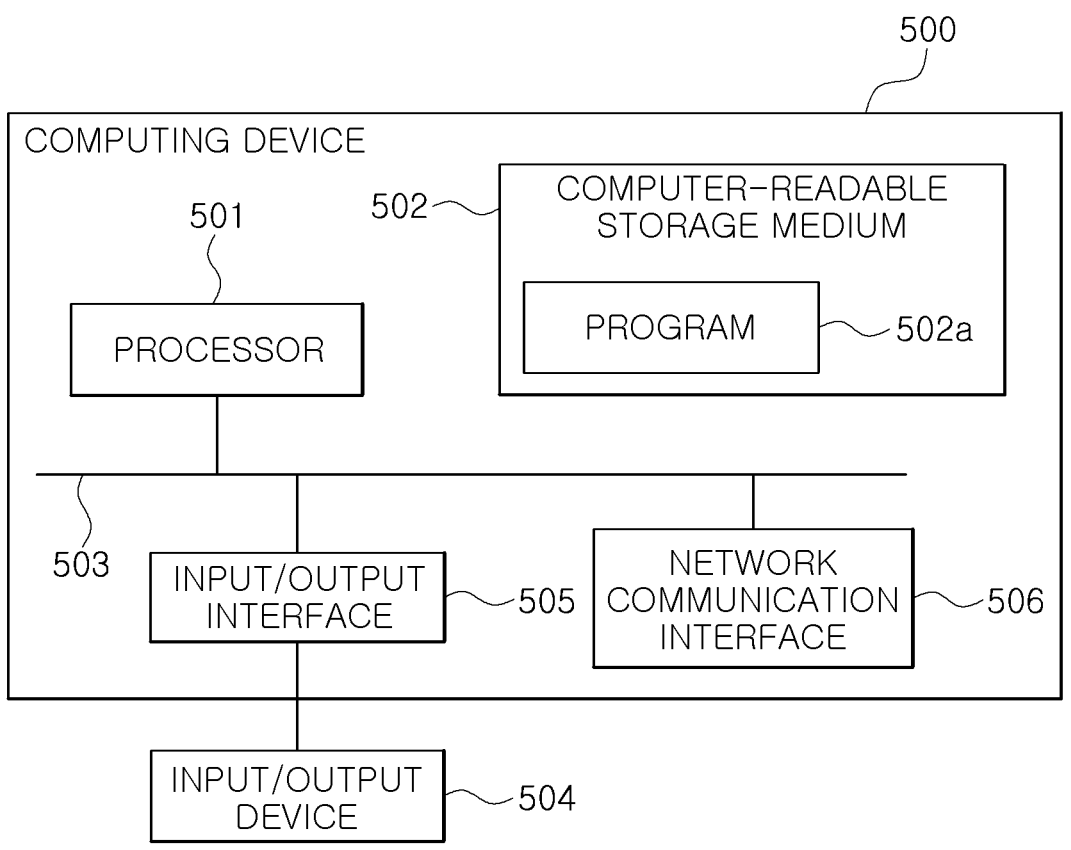
FIG. 5 is a block diagram of a computing device capable of fully or partially implementing an apparatus for dynamic control of a network according to an example embodiment of the present disclosure.

FIG. 5 is a block diagram of a computing device 500 capable of fully or partially implementing an apparatus for dynamic control of a network according to an example embodiment of the present disclosure.

As illustrated in FIG. 5, the computing device 500 may include at least one processor 501, a computer-readable storage medium 502, and a communication bus 503.

The processor 501 may cause the computing device 500 to operate according to the example embodiments described above. For example, the processor 501 may execute one or more programs stored in the computer-readable storage medium 502. The one or more programs may include one or more computer-executable instructions. When executed by the processor 501, the one or more computer-executable instructions may be configured to cause the computing device 500 to perform operations according to example embodiments.

The computer-readable e medium 502 may be configured to store the computer-executable instruction or program code, program data, and/or other suitable forms of information. A program 502a stored in the computer-readable storage medium 502 may include a set of instructions executable by the processor 501.

In an example embodiment, the computer-readable storage medium 502 may be a memory (volatile memory such as a random access memory, non-volatile memory, or any suitable combination thereof), one or more magnetic disk storage devices, optical disk storage devices, flash memory devices, other types of storage media that are accessible by the computing device 500 and are capable of storing desired information, or any suitable combination thereof.

The communication bus 503 may interconnect various other components of the computing device 500, including the processor 501 and the computer-readable storage medium 502.

The computing device 12 may also include one or more input/output interfaces 505 providing an interface for one or more input/output devices 504, and one or more network communication interfaces 506. The input/output interface 505 and the network communication interface 506 may be connected to the communication bus 503.

The input/output device 504 may be connected to other components of the computing device 500 through the input/output interface 505. The exemplary input/output device 504 may include a pointing device (such as a mouse or trackpad), a keyboard, a touch input device (such as a touchpad or touchscreen), a voice or sound input device, input devices such as various types of sensor devices and/or photographing devices, and/or output devices such as a display device, a printer, a speaker, and/or a network card. The exemplary input/output device 504 may be included in the computing device 500 as a component included in the computing device 500, or may be connected to the computing device 500 as a device distinct from the computing device 500.

Example embodiments of the present disclosure may include a program for performing the methods described herein on a computer, and a computer-readable recording medium including the program. The computer-readable recording medium may include, alone or in combination with program instructions, local data files, local data structures, and the like. The medium may be those specially designed and constructed for the purposes of the example embodiments, or may be of the well-known kind and available to those having skill in the computer software arts. Examples of the computer-readable medium include magnetic media such as hard disks, floppy disks, and magnetic tape, optical media such as CD ROM discs and DVDs, magneto-optical media such as optical discs, and hardware devices that are specially configured to store and perform program instructions, such as read-only memory (ROM), random access memory (RAM), flash memory, and the like. Examples of the program may include both a machine code, such as a code produced by a compiler, and a higher-level code that may be executed by the computer using an interpreter.

While example embodiments have been shown and described above, it will be apparent to those skilled in the art that modifications and variations could be made without departing from the scope of the present disclosure as defined by the appended claims.

What is claimed is:

1. An apparatus for dynamic control of a network, the apparatus comprising:

a processor; and a storage medium recording one or more programs configured to be executable by the processor, wherein the one or more programs include instructions for executing:

collecting network monitoring information;

determining, based on the network monitoring information, whether a network abnormality condition is satisfied;

loading, based on a result of the determination, an extended Berkeley packet filter (eBPF) program controlling a network environment by at least one of changing a network bandwidth, changing a routing path, generating a processing time notification, and executing QoS;

setting the network abnormality condition; and mapping the eBPF program to the network abnormality condition, wherein the determining whether the network abnormality condition is satisfied includes:

detecting one or more events included in the network monitoring information; and determining whether the one or more events satisfy the network abnormality condition, wherein the network abnormally condition is set based on at least one of a round trip time (RTT) increase rate, a packet retransmission rate, and an inter packet delay change rate, wherein the network abnormality condition includes a first abnormality condition being satisfied when an event is detected in which the RTT increase rate is 4 times or more, and the one or more programs further instructions for executing:

loading a first eBPF program changing the network bandwidth mapped to the first abnormality condition when the first abnormality condition is satisfied.

2. The apparatus of claim 1, wherein the network abnormality condition includes a second abnormality condition being satisfied when an event is detected in which the packet retransmission rate is 2% or more, and the one or more programs further instructions for executing:

loading a second eBPF program changing the routing path mapped to the second abnormality condition when the second abnormality condition is satisfied.

3. The apparatus of claim 1, wherein the network abnormality condition includes a third abnormality condition being satisfied when an event is detected in which the inter-packet delay change rate is 4 times or more and the RTT increase rate is 3 times or more, and the one or more programs further instructions for executing:

loading a third eBPF program generating the processing time notification mapped to the third abnormality condition when the third abnormality condition is satisfied.

4. The apparatus of claim 1, wherein the network abnormality condition includes a fourth abnormality condition being satisfied when an event is detected in which the inter-packet delay change rate is 4 times or more and the RTT increase rate is less than 3 times, and the one or more programs further instructions for executing:

loading a fourth eBPF program executing the QoS mapped to the fourth abnormality condition when the fourth abnormality condition is satisfied.

5. The apparatus of claim 1, wherein the one or more programs further instructions for executing:

before the collecting the network monitoring information, receiving a packet including identification information; and determining whether a flow of the packet has been generated.

6. The apparatus of claim 5, wherein the one or more programs further instructions for executing:

determining whether the flow of the packet has been terminated, after the loading the eBPF program.

7. A method for dynamic control of a network, the method performed by a computing device including a processor and a storage medium recording one or more programs configured to be executable by the processor, the method comprising:

collecting network monitoring information;

determining, based on the network monitoring information, whether a network abnormality condition is satisfied;

loading, based on a result of the determination, an eBPF program controlling a network environment by at least one of changing a network bandwidth, changing a routing path, generating a processing time notification, and executing QoS;

setting the network abnormality condition; and mapping the eBPF program to the network abnormality condition, wherein the determining whether the network abnormality condition is satisfied includes:

detecting one or more events included in the network monitoring information; and determining whether the one or more events satisfy the network abnormality condition, wherein the network abnormally condition is set based on at least one of a RTT increase rate, a packet retransmission rate, and an inter-packet delay change rate, and wherein the network abnormally condition includes a first abnormally condition being satisfied when an event is detected in which the RTT increase rate is fourth times or more, and the loading the eBPF program includes:

loading a first eBPF program changing the network bandwidth mapped to the first abnormality condition when the first abnormality condition is satisfied.

8. The method of claim 7, wherein the network abnormality condition includes a second abnormality condition being satisfied when an event is detected in which the packet retransmission rate is 2% or more, and the loading the eBPF program includes:

loading a second eBPF program changing the routing path mapped to the second abnormality condition when the second abnormality condition is satisfied.

9. The method of claim 7, wherein the network abnormality condition includes a third abnormality condition being satisfied when an event is detected in which the inter-packet delay change rate is 4 times or more and the RTT increase rate is 3 times or more, and the loading the eBPF program includes:

loading a third eBPF program generating the processing time notification notifying a host side mapped to the third abnormality condition when the third abnormality condition is satisfied.

10. The method of claim 7, wherein the network abnormality condition includes a fourth abnormality condition being satisfied when an event is detected in which the inter-packet delay change rate is 4 times or more and the RTT increase rate is less than 3 times, and the loading the eBPF program includes:

loading a fourth eBPF program executing the QoS mapped to the fourth abnormality condition when the fourth abnormality condition is satisfied.

11. The method of claim 7, further comprising:

before the collecting the network monitoring information, receiving a packet including identification information; and determining whether a flow of the packet has been generated.

12. The method of claim 11, further comprising:

determining whether the flow of the packet has been terminated, after the loading the eBPF program.

* * * * *